United States Patent [19]

Houki

[11] Patent Number: 4,847,492

[45] Date of Patent: Jul. 11, 1989

[54] OPTICAL BEAM SCANNER WITH DETECTOR POSITION ADJUSTMENT MEANS

[75] Inventor: Youji Houki, Tokyo, Japan

[73] Assignee: Fujitsu Limited, Kawasaki, Japan

[21] Appl. No.: 125,234

[22] Filed: Nov. 25, 1987

[30] Foreign Application Priority Data

Nov. 28, 1986 [JP] Japan .................................. 61-284696

[51] Int. Cl.⁴ .......................... H01T 3/14; H01T 5/16; H01T 40/14
[52] U.S. Cl. ..................................... 250/235; 350/6.8; 358/494
[58] Field of Search ................. 250/235, 236; 350/6.7, 350/6.8; 358/293, 294

[56] References Cited

U.S. PATENT DOCUMENTS 4,720,632  1/1988  Kaneko .............................. 250/235

*Primary Examiner*—David C. Nelms
*Assistant Examiner*—Eric F. Chatman
*Attorney, Agent, or Firm*—Staas & Halsey

[57] ABSTRACT

An optical beam scanner includes a light source, a deviation unit for deviating a beam from the light source and emitting a scanning beam, a compensation unit for compensating a vertical inclination of the deviation unit and having a first optical element for deforming the scanning beam into a vertically longitudinal oval shape and a second optical element for reforming the oval beam into a round shape and converging the scanning beam on a scanning surface. A detection unit detects the scanning beam and is disposed between the deviation unit and the second optical element.

8 Claims, 8 Drawing Sheets

OPTICAL BEAM SCANNER WITH DETECTOR POSITION ADJUSTMENT MEANS

BACKGROUND OF THE INVENTION (1) Field of the Invention

The present invention relates to an optical beam scanner which is applied, for example, to a laser beam printer.

(2) Description of the Related Art

Figure 5:
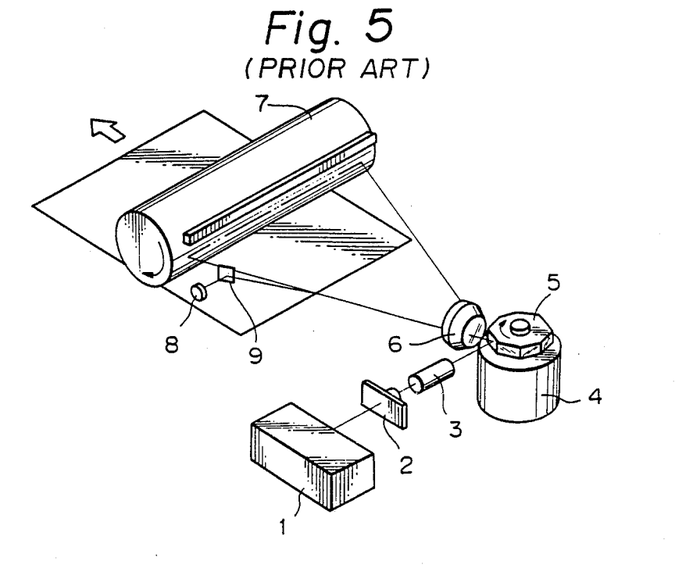
FIG. 5 is a schematic view of an optical beam scanner according to the prior art.

A known optical beam scanner is schematically illustrated in FIG. 5. In this drawing, a scanner controller 1 is connected to a semiconductor laser diode 2 and a laser beam is emitted therefrom by application of a drive signal thereto. The drive signal is based on an ON-OFF signal from an external device (not shown) and a horizontal synchronized signal from a starting point (detection sensor described later). The laser beam emitted from the semiconductor laser diode 2 is collimated to a parallel wave beam by a collimator lens 3 and propagated to and impinged on one of the mirror surfaces of a rotary polygon mirror 5 driven by a scanner motor 4. The beam reflected by the mirror surface is passed through an f-$\theta$ lens 6 to equalize the scanning speed of the laser beam on a plane to be scanned. The laser beam is then irradiated onto a photosensitive drum 7 to be scanned, to form electrostatic latent images thereon.

In this scanning motion, the laser beam reflected by the polygon mirror 5 scans the drum 7 from left to the right in the drawing, in accordance with the rotation of the polygon mirror 5. The scanning laser beam is detected by a starting point detection sensor 8 through a mirror 9, which is disposed at a position corresponding to the left end of the photosensitive drum 7. The output detection signal from the sensor 8 is input to the scanner controller 1 to control the ON-OFF timing of the laser beam.

If the starting point detection sensor 8 is not accurately positioned at a predetermined vertical level, the sensor 8 can not detect the laser beam when the scanning beam is shifted vertically due to an unwanted inclination of the polygon mirror shaft away from vertical. This, reduces the reliability of the detection of the laser beam and causes a mis-synchronization of the scanning motion.

Therefore, conventionally, it has been necessary to provide a fine adjusting means for positioning the sensor 8 at a vertical level at which the luminous intensity of the scanning beam to be detected is at a maximum.

As described above, the conventional optical beam scanner requires a fine adjusting means for precisely positioning the sensor at a vertical level. Much time and labor are required for positioning the sensor, resulting in increased cost of the scanner and reduced reliability of the scanner.

SUMMARY OF THE INVENTION

An object of the present invention is to provide an optical beam scanner wherein the starting point detection sensor is easily positioned at a vertical level without reducing the detection reliability thereof.

Therefore, in accordance with the present invention, there is provided an optical beam scanner including: a deviation means having a mirror surface on which an optical beam emitted from an optical light source is impinged, the beam being deviated by rotating the mirror surface about an axis of the deviation means; an f-$\theta$ lens for equalizing the deviated beam speed on a scanning surface; an optical compensation means for compensating for an inclination of the mirror surface of the deviation means, the optical compensation means including a cylinder lens or a cylinder mirror disposed in a space between the f-$\theta$ lens and the scanning surface; and, detection means for receiving the deviated optical beam and detecting a scan starting position of the optical beam, wherein the detection means is disposed between the f-$\theta$ lens and the optical compensation means.

In accordance with the present invention, in order to easily adjust and arrange the optical beam scan starting position detection means at an optimum vertical level, an optical compensation means is provided for compensating for an inclination of the mirror surface of the deviation means, the compensation means including at least a cylinder lens and a cylinder mirror disposed in a space between the f-$\theta$ lens and the scanning surface, wherein the detection means is disposed between the f-$\theta$ lens and the optical compensation means, and the detection means detects the scanning beam having a vertically longitudinal oval shape.

BRIEF DESCRIPTION OF THE DRAWINGS

FIGS. 2(a) and (b) the diagrammatic views illustrating a compensation systems for compensating for an inclination of a scanning mirror surface; according to the present invention

DETAILED DESCRIPTION OF THE PREFERRED EMBODIMENTS

Figure 1:
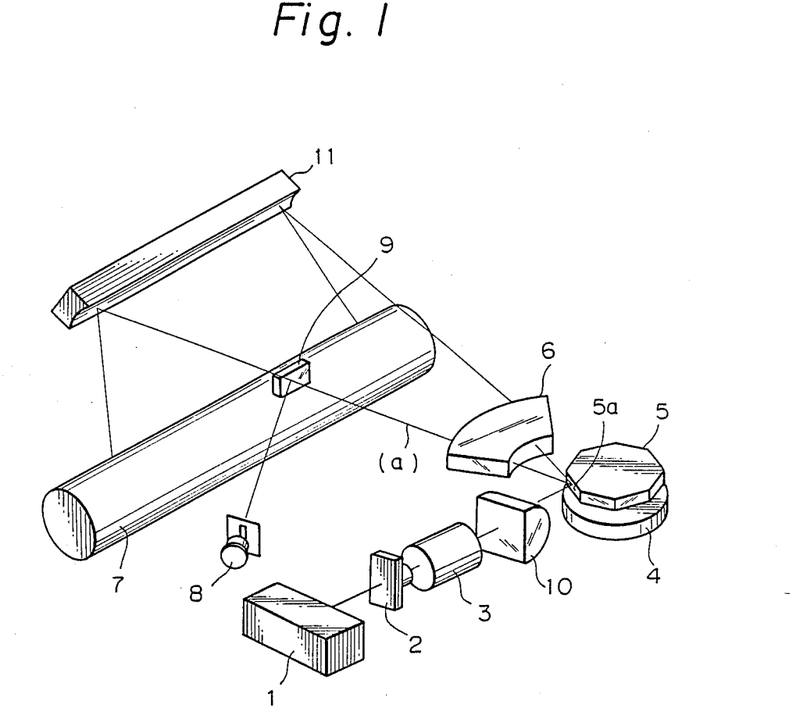
FIG. 1 is a schematic view of an optical beam scanner according to the present invention.

The object of the present invention mentioned before is achieved by an optical beam scanner, as illustrated in FIG. 1, including a deviation means 5 having a mirror surface 5a on which an optical beam emitted from an optical light source 2 is impinged. The beam is deviated by rotating the mirror surface 5a about an axis of the deviation means 5. An f-$\theta$ lens 6 equalizes the deviated beam speed on a scanning surface, and an optical compensation means compensates for an inclination of the mirror surface 5a of the deviation means 5. The compensation means includes a cylinder lens 10, and a cylinder mirror 11 disposed in a space between the f-θ lens 6 and the scanning surface. Detection means 8 receives the deviated optical beam and detects a scan starting position of the optical beam. The detection means 8 is disposed between the f-θ lens 6 and the optical compensation means (cylinder mirror 11).

In the above-mentioned structure, the optical compensation means includes a cylinder lens 10 and a cylinder mirror 11, which is disposed in a space between the f-θ lens 6 and the scanning surface, to compensate for an inclination of the mirror surface 5a of the deviation means 5. With this structure, the optical beam is deformed to a vertically longitudinal oval shape between the f-θ lens and the optical cylinder mirror 11. Therefore, it is easier to detect the optical beam between the f-θ lens 6 and the cylinder mirror 11 when the optical beam has a vertically longitudinal oval shape than when the optical beam has a round shape. Thus it is easier to adjust the vertical position of the sensor 8.

The optical beam scanner according to the present invention is further explained with reference to FIG. 1.

In FIG. 1, parts corresponding to those of FIG. 5 are designated by the same reference numerals and the explanation thereof is omitted. The parallel wave beam collimated through the collimator lens 3 is converged on the mirror surface 5a of the polygon mirror 5 after passing through the cylinder lens 10, due to the converging function of the lens 10. The cylinder mirror 11 is disposed at a position such that the scanning point on the photoconductor drum 7 and the reflection point on the mirror surface 5a of the polygon mirror 5 are in conjugation.

The cylinder lens 10 and the cylinder mirror 11 cooperate to constitute the compensation means for compensating for an inclination of the mirror surface 5a of the polygon mirror 5.

The function of the compensation means is described with reference to FIG. 2. The scanning beam is always converged at the same level on the scanning surface, regardless of the vertical inclination of the mirror surface 5a of the polygon mirror 5, because the deviation point (reflection point on the mirror surface 5a of the polygon mirror 5) and the scanning point on the scanning surface are in conjugation.

Figure 2:
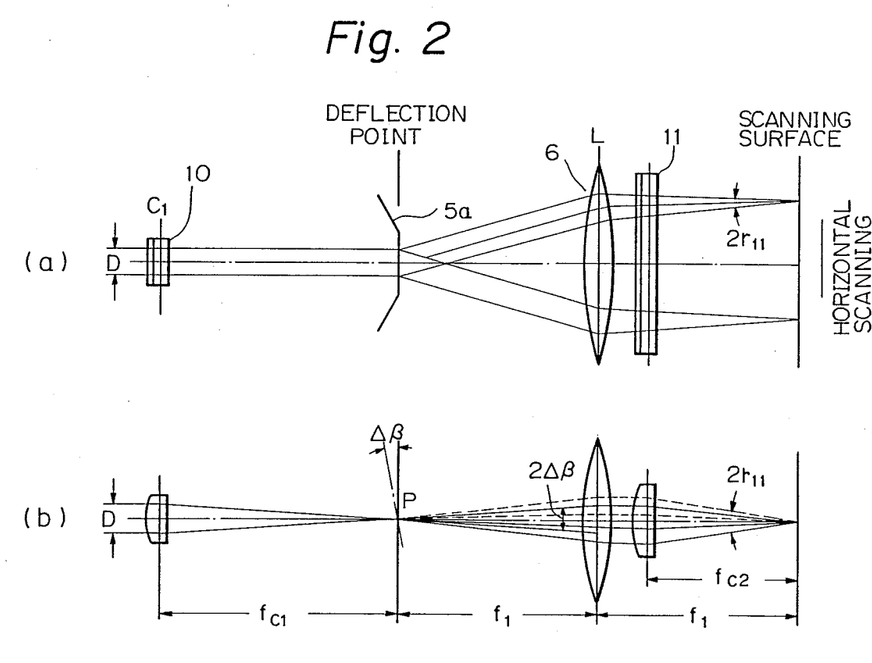

Such a conjugate arrangement is formed by disposing the cylinder lens 10 between the light source 2 and the polygon mirror 5 so that the optical beam from the light source 2 is vertically converged at a point on the polygon mirror 5, and by disposing the cylinder mirror 11 (or cylinder lens as illustrated in FIG. 2) between the f-θ lens 6 and the scanning surface.

With this arrangement, as shown in a plan view (horizontal view) in FIG. 2(a), the cylinder lens 10 and the cylinder mirror (or lens) 11 do not have a curvature of the surface thereof. Therefore, the beam path is not deflected by these optical elements 10 and 11. Whereas, in a vertical view illustrated in FIG. 2(b), the optical beam is converged at a reflection point on the mirror surface 5a of the polygon mirror 5 and the beam is again converged at a scanning point on the scanning surface, wherein the scanning point is in conjugation with the reflection point. Therefore, the beam converged at the reflection point is always converged at the same scanning point, as illustrated by dash lines, even if the mirror surface 5a of the polygon mirror 5 is vertically inclined by $\Delta\beta$ degrees.

In the above description, the compensation means includes the cylinder lens 10 which converges the optical beam at a deviation point which is in conjugation with the scanning point, but the compensation means is not limited to this structure.

Namely, in place of the cylinder lens 10, it is possible to use an anamorphic optical element (i.e., an optical element having different magnifications in the two principal meridians) such as a toric lens (i.e., a lens having a cylindrical surface on one side and a spherical or plane surface on the other side) to compensate for the difference in the focus of the cylinder mirror 11 in the vertical and the horizontal planes.

Figure 3:
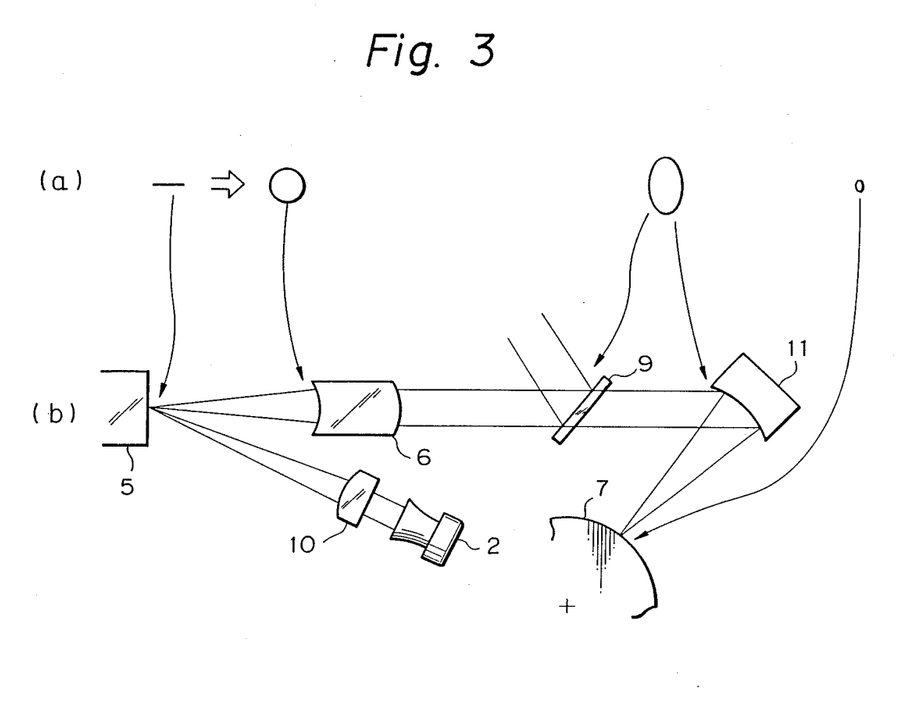
FIG. 3 is a schematic plan view of optical beam shapes at different positions; according to the present invention

The shape of the optical beam in section is described below with reference to FIG. 3. The laser beam from the semiconductor diode 2 has a shape of a line at the mirror surface 5a of the polygon mirror 5. This line is parallel to the axis of the cylinder lens 10. The beam has a shape that is nearly round, when in front of the f-θ lens 6. After passing through the f-θ lens 6, the beam is deformed to an elliptical shape and has a vertically longitudinal oval shape at the mirror 9 and cylinder mirror 11. The longitudinal diameter of the oval beam at that point is longer than the diameter of the parallel wave beam collimated by the collimator lens 3. The beam has a round shape when converged on the photoconductor drum 7.

Accordingly, the mirror 9 reflects a vertically enlarged laser beam toward the sensor 8, which makes it possible to roughly vertically position the sensor 8 without reducing the functional reliability thereof.

Figure 4:
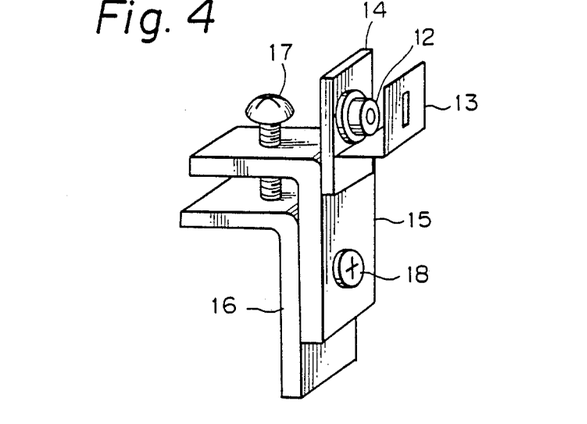
FIG. 4 is a perspective view of an adjuster means for vertically adjusting the position of the start point detection sensor; according to the present invention

FIG. 4 is a perspective view of means for adjusting the vertical position of the starting point of the detection sensor 8. The sensor 8 includes a light receiving element 12 which receives and detects the oval laser beam reflected by the mirror 9, a slit plate 13 for shaping the beam, a printed circuit board 14 for mounting the light receiving element 12, an L-shaped bracket 15 to which the printed circuit board is secured, an L-shaped support 16 which is secured to a frame of the scanner (not shown), a screw 17 in threaded engagement with the bracket 15, for vertically shifting the bracket 15, and a securing screw 18 for locking the bracket 15 at an adjusted position with respect to the support 16.

The vertical level of the light receiving element 12 is adjusted by screwing or unscrewing the screw 17 so that the output of the light receiving element 12 is at a maximum when receiving the scanning beam. The bracket 15 is then secured at the adjusted level by tightening the screw 18.

The above-mentioned adjusting operation can be readily carried out in a short time, since it is not necessary to precisely align the light receiving element 12 with the center of the optical beam as the beam has a larger longitudinal diameter than that of a round optical beam. This makes it unnecessary to use adjuster means having a high degree of accuracy, and thus reduces the cost of the scanner. Such a rough adjusting operation can be carried out using the adjuster screw 17.

The compensation means which compensates for vertical inclination of the polygon mirror 5 of the above-mentioned embodiment includes the cylinder mirror 11 disposed in a space between the f-θ lens and the scanning surface. However, a cylinder lens may be used instead of the cylinder mirror, as illustrated in FIG. 2(b). Also, instead of arranging the deviation point and the scanning point in conjugation, the focus of the lens system may be compensated by a toric lens assembled as a component of the f-θ lens.

As mentioned above, in accordance with the present invention, the optical beam scanner includes a polygon mirror surface inclination compensation means having a cylinder lens or cylinder mirror, wherein the sensor for detecting starting point (starting timing of the scanning operation) is disposed in a space between the f-θ lens and the compensation means, in which space the beam diameter is vertically enlarged. Therefore, the adjusting operation for vertically positioning the sensor is easily carried out and the cost of the adjusting means is reduced.

Figure 6:
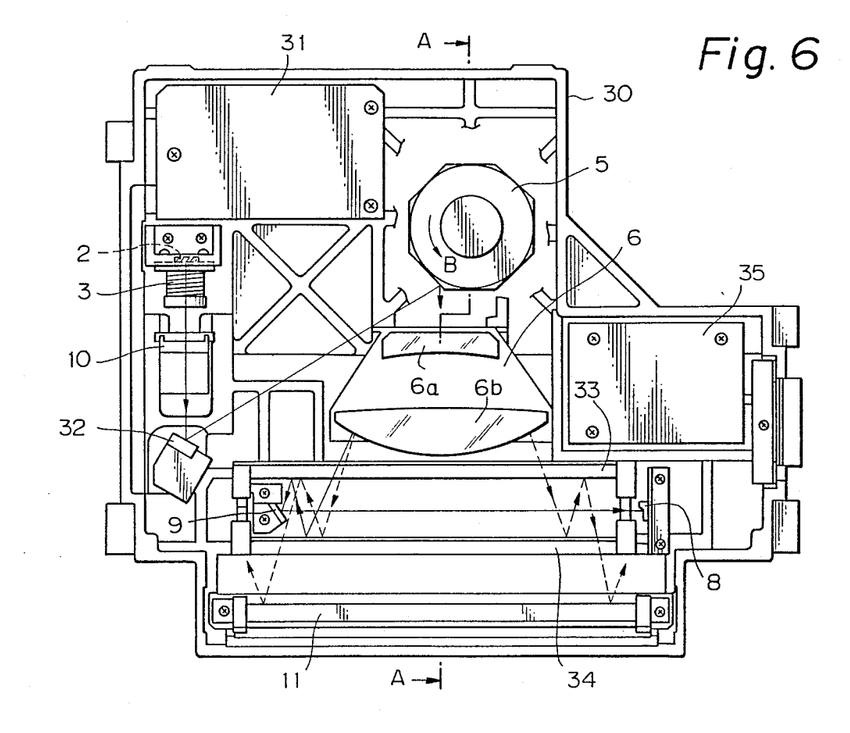
FIG. 6 is a plan view of an optical beam scanner according to the present invention.
Figure 7:
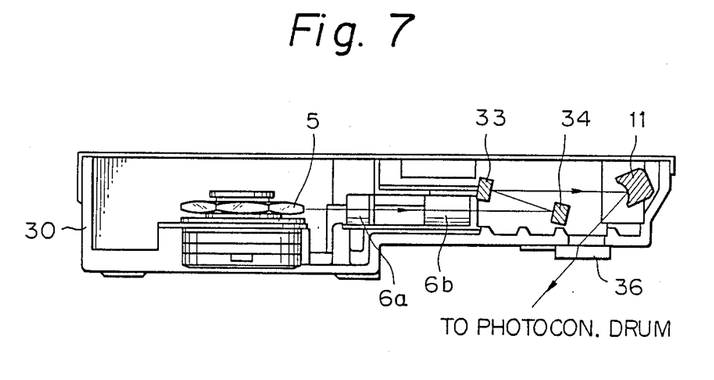
FIG. 7 is a cross sectional view taken along a line A—A of FIG. 6.

FIGS. 6 and 7 illustrate an optical beam scanner according to the present invention, which is used as a scanner for a laser printer. A case 30 houses the aforementioned constituents, namely, a laser diode (light source) 2, a collimator lens 3, a cylinder lens 10, a rotary polygon mirror 5, an f-θ lens 6, and a cylinder mirror 11. A laser beam reflection mirror 32 is disposed in front of the cylinder lens 10. The f-θ lens 6 comprises a pair of lenses 6a and 6b. Between the f-θ lens 6 and the cylinder mirror 11 is disposed a pair of mirrors 33 and 34 which are located at vertically different levels. This pair of mirrors 33 and 34 is used for widening the scanning range on the scanning surface by elongating the beam path from the polygon mirror to the scanning surface. A mirror 9 for reflecting the scanning laser beam to be detected is disposed at one end of the pair of mirrors 33 and 34, and a sensor 8 is disposed at the other end of the pair of mirrors 33 and 34. A laser diode drive circuit 31 is connected to the sensor 8 so that a timing for starting the printing operation in one scanning line is calculated and the laser diode 2 is driven in accordance with the printing signal from the starting timing in the scanning line. Numeral 35 designates a spindle drive circuit for controlling the rotary motion of the polygon mirror 5.

The laser beam from the laser diode 2 passes through the collimator lens 3 and the cylinder lens 10 and reaches the mirror 32 where the beam is reflected toward the polygon mirror 5. The polygon mirror 5 rotates in the direction of an arrow B to swing the laser beam so as to produce a scanning beam moving from left to right in FIG. 6. The scanning beam passes through the f-θ lens 6 and is reflected by the pair of mirrors 33 and 34. The reflected beam is propagated and impinged on the cylinder mirror 11 (dash line). The scanning laser beam reflected by the cylinder mirror 11 irradiates a photoconductor drum (not shown) to print an image thereon. A part of the scanning beam (solid line) at the end of the scanning range (outside of the printing region) is reflected by the mirror 9 and guided toward the sensor 8. As described before, the mirror 9 is arranged in front of the cylinder mirror 11, and the laser beam reflected by the mirror 9 has a vertically elongated oval sectional shape. Therefore, the laser beam is easily detected by the detection sensor 8, even if the sensor is roughly positioned in the vertical direction.

Figure 8:
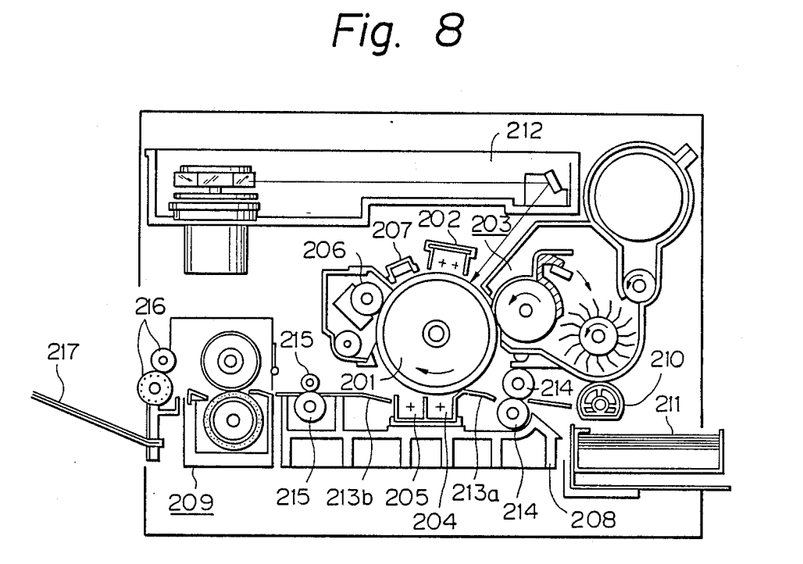
FIG. 8 is a schematic view of an electrostatic printer to which the optical beam scanner according to the present invention is applied.

FIG. 8 illustrates an electrostatic printer as an example of an equipment to which the optical beam scanner according to the present invention is applied.

The electrostatic printer of FIG. 8 includes an electron charger 202, a developer 203, a transfer 204, a paper separator 205, a cleaner 206, and an electron remover 207 all of which are disposed around a photoconductor drum 201 having a photosensitive layer provided on the surface thereof. The electron charger 202 evenly charges the entire surface of the photoconductor drum 201, which rotates in the clockwise direction, and then, an electrostatic latent image is formed on the surface of the drum 201 in response to optical image signals emitted from an optical unit (optical scanner) 212 through a reflection mirror. The latent image is then developed to a visible image (toner image) by the magnetic brush type developer 203. A printing paper is taken out from a paper cassette 211 by a pick roller 210 and conveyed to the transfer 204 through a lower guide 213a in synchronization with the rotation of the photoconductor drum 201. The latent image formed on the photoconductor drum 201 is transferred to the paper by the transfer 204. The printed paper having the visible image transferred thereon is separated from the photoconductor drum 201 by the AC discharge operation of the paper separator 205 and conveyed along a lower guide 213b to a heat roller type fixture device 209 through a feed roller 215. The toner image is heated and fixed by the fixing device 209. The printed paper is then discharged and stacked on a stacker 217 by a discharge roller 216. After the toner transfer operation to the paper is completed, remaining toner is removed from the surface of the photoconductor drum 201 by the cleaner 206. Remaining electron charges are then removed from the surface of the drum 201 by the electron remover 207. The above-mentioned printing operation is then repeated.

The optical scanner assembled in the above-mentioned electrostatic printer scans the photoconductor drum 201 by emitting ON-OFF signals corresponding to patterns to be printed, so that the latent images of the patterns to be printed are formed on the photoconductor drum 201.

Figure 9:
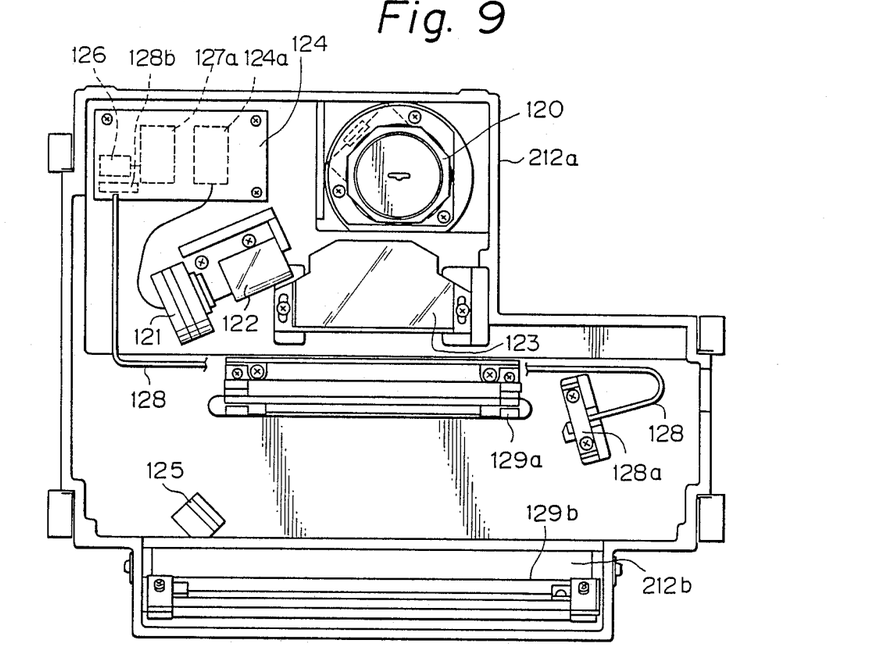
FIG. 9 is a schematic view of another example of the optical beam scanner according to the present invention.
Figure 10:
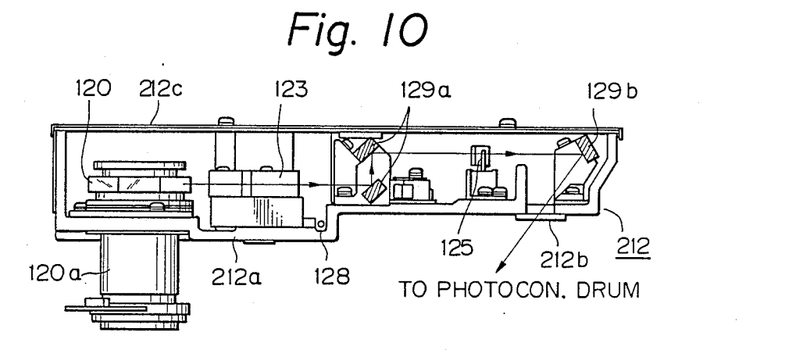
FIG. 10 is a vertical cross sectional view of the scanner of FIG. 9.

An example of the optical beam scanner 212 assembled within the electrostatic printer is illustrated in FIGS. 9 and 10. In this example, the detection means for sensing the scanning start point receives the scanning beam at an end of the scanning range and transmits the beam to a laser diode drive circuit through an optical fiber. However, the scanning beam can be directly detected by a sensor disposed at the receiving point of the beam and converted to an electric signal to be transmitted to the drive circuit through electric wires, instead of the optical fiber.

Disposed in an optical unit frame 212a are a polygon mirror 120, a semiconductor laser diode 121, a collimator lens 122, an f-θ lens 123, a printed circuit board 124, a reflection mirror 125, and an optical fiber 128. A scanning beam is emitted from the unit frame 212a toward a photoconductor drum through a window 212b. A cover 212c covers the unit frame 212a, and a spindle motor 120a is disposed below the unit frame 212a and directly drives the polygon mirror 120. A pair of mirrors for elongating the beam path is provided for widening the scanning range by elongating the path of the beam from the f-θ lens 123. The scanning beam is propagated through the polygon mirror 120, f-θ lens 123, and a pair of beam path elongating mirrors and impinged on an output mirror 129b, whereby the beam is reflected and emitted out of the unit frame 212 through the window 212b.

As mentioned above, the unit frame 212a houses the polygon mirror 120, the semiconductor laser diode 121, the collimator lens 122, the f-θ lens 123, the pair of beam path elongating mirrors 129a, and the output mirror 129b. These elements constitute a scanning system. The laser beam from the laser diode 121 is irradiated to the polygon mirror 120 through the collimator lens 122 and reflected thereby to be propagated and emitted out of the scanner through the f-θ lens 123, the pair of beam path elongating mirrors 129a, the output mirror 129b, and through the window 212b.

The reflection mirror 125 is disposed at the left in FIG. 9, and the end of the optical fiber 128 is secured at the start point detection position by a clamp 128a. The start point detection position is the position where the beam at the left of the scanning beam range from the polygon mirror 120 is received at the mirror 125. One end of optical fiber 128 is disposed below the pair of beam path elongating mirrors 129a, and is substantially parallel therewith. Toward the printed circuit board 124, the other end of the optical fiber 128, is clamped by a clamp 128b.

A light receiving diode 126 is disposed on the printed circuit board 124 in the vicinity of the end of the optical fiber 128. Also, on the printed circuit board 124 are disposed a stabilization circuit 127a and a monitor circuit 124a, as shown in FIG. 11.

The unit frame 212a is covered by the cover 212c to protect the unit from dust.

Figure 11:
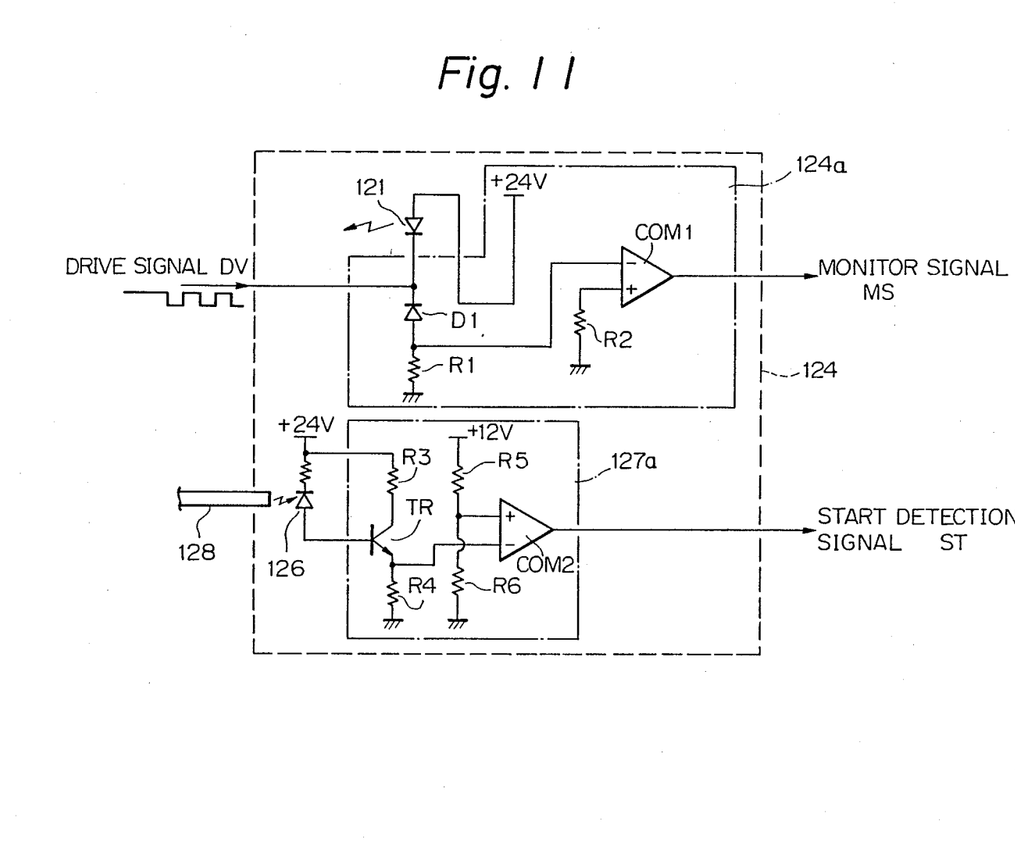
FIG. 11 is a circuit diagram of an example of the laser beam detection sensor (start point detection sensor) according to the present invention.

FIG. 11 is a circuit diagram of the monitor circuit 124a and the stabilization curcuit 127a. A monitor diode D1 is connected to the semiconductor laser diode 121. A drive signal DV is transmitted to the connection point between the monitor diode D1 and the laser diode 121 from a main printed circuit board. An output resistance R1 outputs a voltage signal in response to the ON-OFF operation of the laser diode 121. A comparator COM1 compares the detection voltage through the resistance R1 with a reference voltage from a reference resistance R2 and outputs a monitor signal MS after shaping same.

A transistor TR constitutes an amplifier for increasing an output from the light receiving diode (photodiode) 126. The transistor TR comprises a collector resistance R3 and an emitter resistance R4. A comparator COM2 compares an emitter output from the transistor (amplifier) TR with a reference voltage from voltage separation resistances R5 and R6, and outputs a start point detection signal ST.

The laser beam from the semiconductor laser diode 121 is passed through the collimator lens 122 and is impinged on the polygon mirror 120, which then reflects the beam. The polygon mirror 120 is rotated in a predetermined direction at a constant speed, to swing the laser beam so that it is propagated as a scanning beam. The scanning beam from the polygon mirror 120 is passed through the f-θ lens 123 and the pair of beam path elongating mirrors 129a toward the output reflection mirror 129b.

The scanning beam from the polygon mirror 120 scans beyond the scanning range (printing range) to be actually used in a printing operation. The scanning beam at the left end of the scanning range (outside the printing range to be actually used) is reflected by the mirror 125 and enters the optical fiber 128. The optical fiber transmits the beam to the light receiving diode 126 on the printed circuit board 124 where the beam is converted to an electric signal, which is amplified and shaped by the stabilization circuit 127a and transmitted to the main printed circuit board (main controller) as a start point detection signal ST.

The main printed circuit board, by using the start point detection signal as a trigger signal, outputs and transmits the drive signal DV to the semiconductor laser diode 121 in response to a pattern to be printed. With this arrangement, the scanning beam is ON-OFF controlled in accordance with the printing pattern within the printing range and impinged on the photoconductor drum 201 through the output reflection mirror 129b and the window 212b, to form a latent image on the photo-conductor drum 201. Also, the operation of the semi-conductor laser diode 121 is monitored by the monitor circuit 124a, which outputs a monitor signal MS to the main printed circuit board and the monitor signal MS is used as a confirmation signal to confirm the predetermined normal operation of the semiconductor laser diode 121.

Note, instead of using the optical fiber as used in the above-mentioned example, an optical sensor may be directly disposed at an end of the scanning range of the scanning beam to transmit the detection signal to the laser diode drive circuit (designated by numeral 1 in FIG. 1, numeral 31 in FIG. 6, and numeral 124 in FIG. 11). Thus a similar circuit to that of FIG. 11 can be used in the example of FIG. 1 or FIG. 6.

I claim:

1. An optical beam scanner comprising:
   a light source for emitting a beam;
   deviation means, optically associated with the light source, for deviating the beam from the light source and for emitting the deviated beam as a scanning beam;
   compensation means, optically associated with the deviation means, for compensating for a vertical inclination of the deviation means, said compensation means including a first optical element for deforming the scanning beam into a vertically longitudinal oval shape and a second optical element for reforming the oval-shaped beam into a round shape and for converging the scanning beam onto a scanning surface;
   detection means, optically associated with the compensation means, for detecting the scanning beam, said detection means being disposed between the deviation means and the second optical element of the compensation means so that the detection means receives a non-reformed oval-shaped beam from the deviation means; and
   adjustment means for vertically shifting and fixing the detection means at an adjusted position, wherein the ability of the detection means to detect the scanning beam is increased due to the oval shape of the beam received thereby.

2. An optical beam scanner according to claim 1, further comprising an f-θ lens for moving the scanning beam at a constant speed on the scanning surface, the f-θ lens being disposed in a beam path between the deviation means and the second optical element of the compensation means.

3. An optical beam scanner according to claim 2, wherein the detection means is disposed between the f-θ lens and the second optical element.

4. An optical beam scanner according to claim 1, wherein the first optical element comprises a cylinder lens and the second optical element comprises a cylinder mirror, the cylinder lens and the cylinder mirror being disposed at positions in conjugation with each other.

5. An optical beam scanner according to claim 1, wherein the detection means outputs a detection signal, and the optical beam scanner further comprising a control circuit for controlling a start point of a scanning operation by the beam from the light source, said control circuit being responsive to the outputted detection signal from the detection means.

6. An optical beam scanner comprising:

deviation means having a mirror surface for deviating an optical beam emitted from an optical light source, the beam being deviated by rotating the mirror surface about an axis of the deviation means;

an f-$\theta$ lens for equalizing the deviated beam speed on a scanning surface;

optical compensation means for compensating a vertical inclination of the mirror surface of the deviation means, the optical compensation means including a cylinder lens disposed between the light source and the deviation means for deforming the scanning beam into a vertically longitudinal oval shape and a cylinder mirror disposed between the f-$\theta$ lens and the scanning surface for reforming the oval-shaped beam into a round shape and for converging the scanning beam onto a scanning surface;

detection means for receiving the deviated optical beam and for detecting a starting position of the scanning operation by the optical beam, the detection means being disposed between the f-$\theta$ lens and the cylinder mirror so that the detection means receives a non-reformed oval-shaped beam from the deviation means; and adjustment means for vertically shifting and fixing the detection means at an adjusted position, wherein the ability of the detection means to detect the scanning beam is increased due to the oval shape of the beam received thereby.

7. An optical beam scanner according to claim 2, wherein the first optical element comprises a cylinder lens and the second optical element comprises a cylinder mirror, the cylinder lens and the cylinder mirror being disposed at positions in conjugation with each other.

8. An optical beam scanner according to claim 3, wherein the first optical element comprises a cylinder lens and the second optical element comprises a cylinder mirror, the cylinder lens and the cylinder mirror being disposed at positions in conjugation with each other.

* * * * *